(12) United States Patent
Periyathambi et al.

(10) Patent No.: US 10,983,996 B2
(45) Date of Patent: Apr. 20, 2021

(54) ASYNCHRONOUS PREDICTIVE CACHING OF CONTENT LISTED IN SEARCH RESULTS

(71) Applicant: eBay Inc., San Jose, CA (US)

(72) Inventors: Ramesh Periyathambi, San Ramon, CA (US); Vineet Bindal, San Jose, CA (US); Naga Sita Raghuram Nimishakavi Venkata, San Jose, CA (US); Deepti Bhosale, San Jose, CA (US); Auston McReynolds, Sacramento, CA (US); Andrew Lin, San Jose, CA (US); Lakshimi Duraivenkatesh, San Ramon, CA (US)

(73) Assignee: eBay Inc., San Jose, CA (US)

( * ) Notice: Subject to any disclaimer, the term of this patent is extended or adjusted under 35 U.S.C. 154(b) by 163 days.

(21) Appl. No.: 16/243,880

(22) Filed: Jan. 9, 2019

(65) Prior Publication Data
US 2020/0218724 A1    Jul. 9, 2020

(51) Int. Cl.
*G06F 16/24* (2019.01)
*G06F 16/2453* (2019.01)
*G06F 16/957* (2019.01)
*G06F 16/955* (2019.01)
*G06F 16/9535* (2019.01)
*G06F 16/9538* (2019.01)

(52) U.S. Cl.
CPC .... *G06F 16/24539* (2019.01); *G06F 16/9535* (2019.01); *G06F 16/9538* (2019.01); *G06F 16/9558* (2019.01); *G06F 16/9566* (2019.01); *G06F 16/9574* (2019.01)

(58) Field of Classification Search
CPC .................................................. G06F 16/24539
USPC ........................................................ 707/736
See application file for complete search history.

(56) References Cited

U.S. PATENT DOCUMENTS 6,310,941 B1 * 10/2001 Crutcher ............... G06F 16/954
                                                              379/88.17
7,908,336 B2    3/2011 Carlson et al.
8,447,837 B2    5/2013 Devanneaux et al.
(Continued)

FOREIGN PATENT DOCUMENTS

WO    2018/076388 A1    5/2018
WO    2020/146019 A1    7/2020

OTHER PUBLICATIONS

Lempel et al., "Predictive Caching and Prefetching of Query Results in Search Engines", May 20-24, 2003, pp. 19-28.
(Continued)

*Primary Examiner* — Syling Yen
(74) *Attorney, Agent, or Firm* — FIG. 1 Patents (57) ABSTRACT

Technologies described reduce the amount of time between requesting content and receiving the requested content. In some embodiments, a client provides a search query. A search result page is generated and, prior to returning the search result page to the client, some or all of the search results are asynchronously pre-fetched and cached. The search query can include custom parameters that are also included in the pre-fetch requests. Web addresses in the search results page can be modified to indicate whether a prefetch operation was initiated. Once a user activates one of the search results, the responding web server uses the cached data while generating a response.

20 Claims, 9 Drawing Sheets

(56) References Cited

U.S. PATENT DOCUMENTS

| | | | |
|---|---|---|---|
| 8,516,041 B1 | 8/2013 | Miles | |
| 8,719,265 B1* | 5/2014 | Bedrax-Weiss | G06F 16/951 707/736 |
| 9,299,030 B1* | 3/2016 | Hotchkies | G06N 5/046 |
| 9,552,489 B1* | 1/2017 | Siegel | G06F 16/958 |
| 9,560,015 B1* | 1/2017 | Glazemakers | H04L 63/029 |
| 2002/0062384 A1 | 5/2002 | Tso | |
| 2006/0277167 A1* | 12/2006 | Gross | G06F 16/9577 |
| 2009/0094417 A1* | 4/2009 | Carlson | G06F 16/9574 711/137 |
| 2011/0093790 A1 | 4/2011 | Maczuba | |
| 2013/0346704 A1* | 12/2013 | Burger | G06F 16/9574 711/137 |
| 2015/0188981 A1* | 7/2015 | Liang | H04L 67/02 709/225 |
| 2017/0223049 A1* | 8/2017 | Kuperman | H04L 63/1466 |
| 2020/0120178 A1* | 4/2020 | Subramanian | H04L 67/2847 |

OTHER PUBLICATIONS

International Search Report received for PCT Application No. PCT/US2019/053796, dated Nov. 27, 2019, 4 pages.
International Written Opinion received for PCT Application No. PCT/US2019/053796, dated Nov. 27, 2019, 8 pages.

* cited by examiner

ASYNCHRONOUS PREDICTIVE CACHING OF CONTENT LISTED IN SEARCH RESULTS

BACKGROUND

Software applications commonly invoke tens or hundreds of services to process a request. Depending upon the type of computations performed by the services, a response may not be returned for many seconds, or more. Furthermore, significant computing resources may be used to repeatedly perform these tasks, at great computational cost. These problems are particularly acute for client-server applications, which add network latency on top of actual computation time.

Techniques have been utilized previously to reduce network latency and resource utilization, such as client-side caching, server-side pre-fetching of static content (e.g. crawling the web and storing web pages), etc. However, these techniques are not applicable or effective in all scenarios. For example, client-side caching is typically utilized only after content has been retrieved for the first time and, as such, does not provide a benefit while it is first being retrieved. Similarly, server-side pre-fetching is not applicable to real-time generated content, particularly when the content is user-specific. As a result, the benefits provided by these previous solutions are limited.

It is with respect to these and other technical considerations that the disclosure made herein is presented.

SUMMARY

Technologies described herein reduce latency when retrieving content listed in a real-time search results page. Generally described, the techniques disclosed herein can reduce the amount of time between requesting content and displaying the requested content. Reduced network latency provides many technological benefits, as a computing device implementing the disclosed technologies may operate more performantly than a similar device utilizing traditional techniques. Furthermore, in some embodiments, technologies described herein reduce server-side processing, memory, storage, and network resource utilization by dividing content into content items and re-using user-agnostic content items across multiple requests. Other technical benefits not specifically mentioned herein can also be realized through implementations of the disclosed technologies.

Generally described, techniques disclosed herein prefetch and cache content that was linked to in search results. In some embodiments, entire pieces of content are cached on a per user basis. In other embodiments, content may be divided into user-agnostic content items, which may be cached and later used to respond to requests from different users. Content may also be divided into data that can be stale (i.e. data that may no longer be completely accurate, e.g. a list of recently viewed items) and data that cannot be stale (e.g. a corporate logo). Data that cannot be stale may be cached for future use, while stale data may be discarded.

In some embodiments, a search query is received from a client. Before the search results page is returned to the client, prefetching is performed by sending a request for one or more items listed in the search results page. The requests may be performed synchronously, in which case the responses are cached, in whole or in part, before the search results page is returned. The requests may also be performed asynchronously by sending a list of search results to a prefetch engine before returning the search results page. The prefetch engine may then synchronously prefetch and cache the content while the search results page is transmitted to and rendered by the client. When the client later requests one of the search results that was prefetched (e.g. by a user clicking on one of the links in the search results pate), the server responding to the request may retrieve some or all of the requested content from the cache.

In some embodiments, the search results page is altered before being returned to the client. For example, Uniform Resource Locators (URLs) in the search results page may be modified to include a query parameter indicating that a prefetch operation was initiated. This query parameter may be used by a server to determine if cached content is available. Similarly, when the client application is a native application (e.g. an Android® or iOS® application), headers for content requests may be altered to indicate that a prefetch operation was initiated for the requested content.

In some embodiments, when sending a search request, the client may include context data, such as browser type, screen resolution, and other information usable by the prefetch engine when requesting content. This context data may be included by the prefetch engine in the prefetch request to impersonate the client.

The client may also include custom parameters in a search request. Custom parameters may be conveyed as a query parameter in a URL, or in the case of native applications, as part of a request header. The prefetch engine may include these parameters in prefetch requests. In one embodiment, custom parameters enable a client to select from a list of available components to display in the content, e.g. whether to display a complex user interface suitable for a desktop or a simplified user interface designed for a mobile device.

By applying the techniques discussed herein, real world request latency can be reduced in time from seconds (e.g. 3 seconds) to milliseconds (e.g. 20 ms). However, greater or lesser savings may be achieved based on the amount of content that is cached for a particular request, the time it would take to generate the content from scratch, and the cost to detect cached content and integrate it into a response. For example, a request may be satisfied entirely with cached content, eliminating any calls to downstream services, thereby minimizing latency.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

The following Detailed Description describes technologies that reduce latency when retrieving content listed in a search result page. Technical benefits include improved client-side performance, such as reduced latency when clicking on a search result, as well as improved server-side resource utilization by reducing the redundant generation of user-agnostic content items. For example, a user may search an e-commerce website for smartphone cases. At or around the time that a search result page is returned to the user, the top 5 results are pre-fetched and cached. If 7 seconds elapse before the user clicks on one of the search results, then up to 7 seconds of the time it takes to generate the pre-fetched page will not be experienced by the user. Other technical benefits not specifically mentioned herein can also be realized through implementations of the disclosed technologies. While the embodiments disclosed herein are presented primarily in the context of reducing latency when retrieving content on a search result page, it is to be appreciated that the technologies described herein can be utilized to reduce latency when retrieving other types of content.

Figure 1:
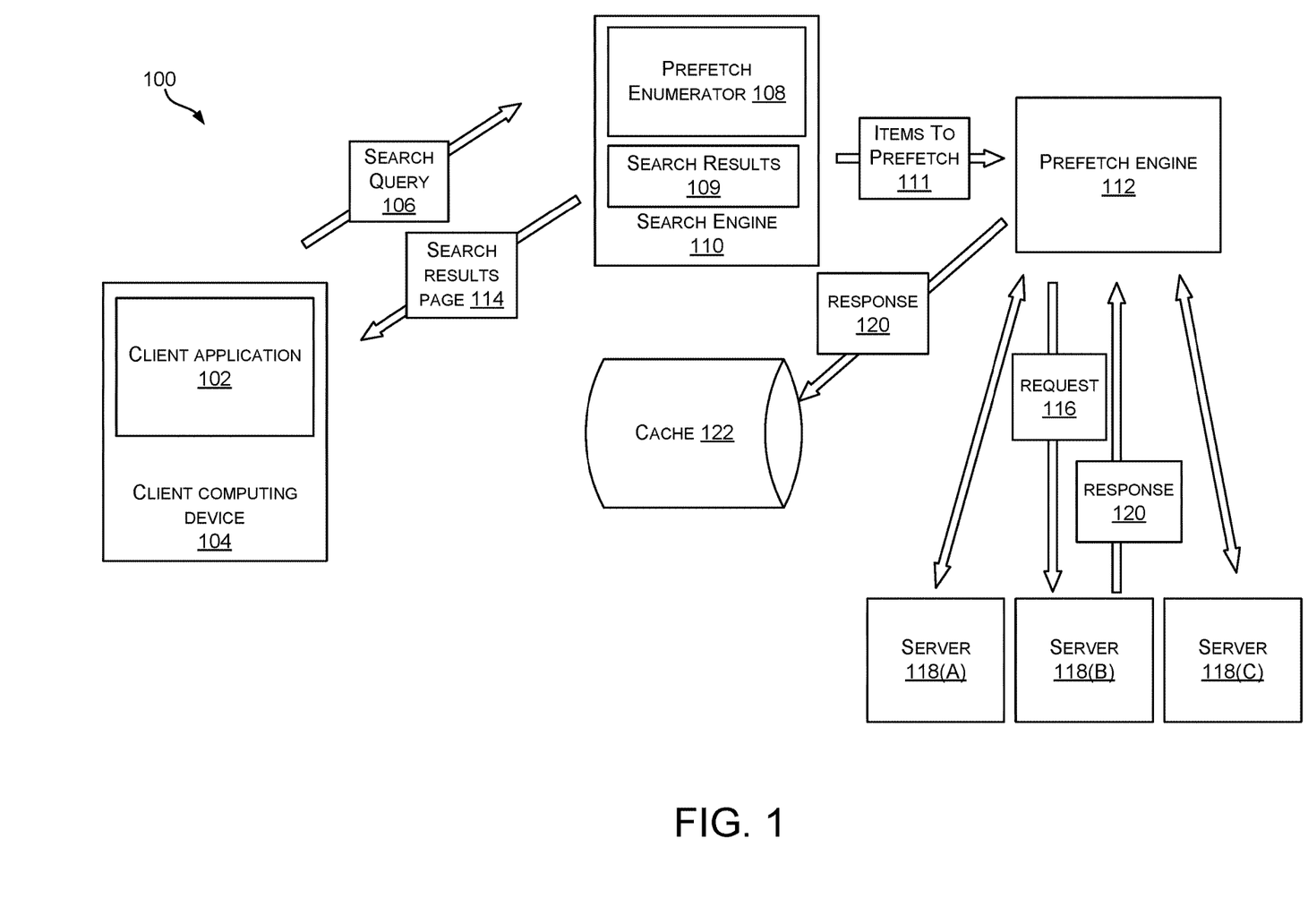
FIG. 1 illustrates an exemplary system for pre-fetching and caching content listed in a search result page.

Turning now to FIG. 1, illustrated is an exemplary system 100 for pre-fetching and caching content listed in a search result page. As illustrated, the system 100 may include client application 102 (also referred to as a "client") executing on client computing device 104. Client application 102 may include a web browser, a 'native' application, e.g. an iOS or Android app, or the like. Client computing device 104 may be any computing device, e.g. a personal computer, a laptop computer, a smartphone, a tablet, or the like.

In some embodiments, client application 102 initiates search query 106. For example, search query 106 may be initiated by a user entering text into a search query box. A search query 106 may also be sent in response to the addition, removal, or modification of parameters of a previously submitted search. For example, parameters in a search for e-commerce items may limit results to items costing less than $100. If a user changes or removes this limit, e.g. limiting search results to items costing less than $50, then a new search query 106 is generated. Search queries may also be pre-generated, e.g. as part of a paid listing that displays search results when clicked. These queries may be referenced by an identifier, which may reference a text based search (or other type or search) stored on a server. Other types of queries are similarly contemplated.

Search query 106 may be received by search engine 110. Search engine 110 executes search query 106, generating a list of search results 109. Search results 109 is a list of documents or other pieces of content that satisfy search query 106. In some embodiments, search engine 110 generates search results page 114 from search results 109. Search results page 114 may include a list of Uniform Resource Locators (URLs) that, when rendered by the client, may be activated (e.g. clicked on) to navigate to one of the search results. Search engine 110 may then return search results page 114 to client application 102 for rendering and display.

In some embodiments, prefetch enumerator 108 may identify one or more of search results 109 to be prefetched. For example, prefetch enumerator 108 may identify the top 5 search results, excluding paid listings. These items to prefetch 111 may be asynchronously sent to prefetch engine 112 for processing. Prefetch enumerator 108 may asynchronously send items to prefetch 111 before transmitting search results page 114 to client application 102. However, the specific order of these operations can change (i.e. search results page 114 may be returned before prefetching is initiated), or they may occur simultaneously. Regardless of which operation is performed first (if any), returning search results page 114 to client 102 and prefetching may be performed concurrently.

When search results page 114 is rendered in a Web Browser, search results page 114 contains URLs. When search results page 114 is rendered in an application, search results page 114 may include page identifiers, database primary keys, or another identifier that identifies one of search results 109.

Prefetch engine 112 may initiate one or more requests 116 for content based on items to prefetch 111. In some embodiments, requests 116 are sent synchronously and concurrently to one or more servers 118 (e.g. servers 118(A), 118(B), 118(C) . . . ).

In some embodiments, prefetching is performed for a defined number of search results 109. For example, prefetching may be performed for the top five search results. However, any defined number of search results may be chosen based on how likely a user is to click on one of the top search results, the cost of prefetching and caching, and other factors. In some embodiments, search results comprising advertisements are omitted from the selection of hyperlinks, because click-through rates are not as high as for ordinary search results.

As responses 120 are received by prefetch engine 112, they are stored in cache 122. In some embodiments, responses 120 from servers 118 are stored in cache 122 in their entirety. In other embodiments, responses 120 from servers 118 are divided into content items and user-agnostic content items stored individually in cache 122. As discussed in more detail below in conjunction with FIG. 5, web responses may be divided by content type, e.g. into markup, stylesheets, code, images, etc., when dealing with web-based content. Additionally, or alternatively, content items may be divided based on whether they are user specific or user-agnostic. In this way, as much of the cached content as possible may be retrieved and applied to subsequent requests for a given web page.

Figure 2:
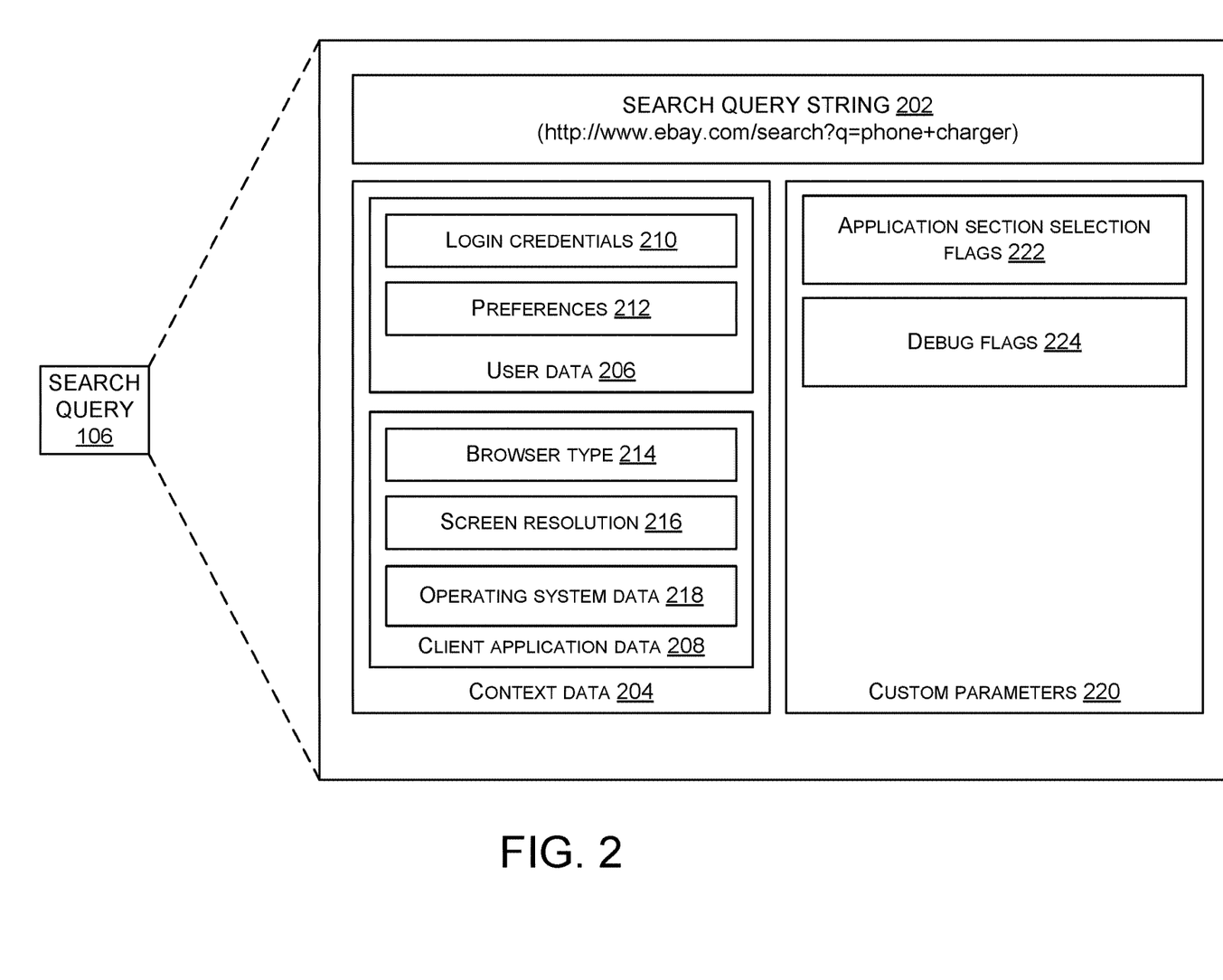
FIG. 2 illustrates an exemplary search query sent by a client.

Turning now to FIG. 2, illustrated is an exemplary search query 106 sent by a client 102. In some embodiments, search query 106 includes search query string 202. Additionally, or alternatively, search query 106 may include an identifier that refers to a saved search or an automatically generated search. Search query string 202 may include query text, e.g. "phone charger" encoded in the query parameter "q=phone+charger". Query string 202 may also include other user-defined search parameters, such as price limits, date ranges, geographic distances, and the like. While the example depicted in FIG. 2 includes a web address, any type of Internet or network address is similarly contemplated, as are other techniques for conveying a search query.

Search query 106 also includes context data 204 and custom parameters 220. Context data 204 may include information normally included in a web request, such as user data 206 and client application data 208. In the web context, this data may be conveyed in cookies, sessions, forms, HTTP headers, or any other means by which information is conveyed to the prefetch engine 112. When client application 102 is a native application, context data may be conveyed in a header (e.g. a request header). User data 206 may include login credentials 210 and preferences 212. Login credentials 210 may include a username and authentication token, while preferences 212 may include a preferred font, color scheme, accessibility options, or the like.

Client application data 208 may include browser type 214, screen resolution 216, operating system data 218, and the like. For example, browser type 214 may indicate the request originated from a CHROME web browser operating on a mobile device. Screen resolution 216 may indicate a screen orientation, resolution, color depth, etc. Operating system data 218 may indicate a name and version of the operating system executing on client computing device 104.

In some embodiments, custom parameters 220 allow client application 102 to supply parameters in search query 106 that will be applied when prefetching content (i.e. in request 116). Examples include application section selection flags 222 and debug flags 224, although any kind of custom parameter is similarly contemplated. Application section selection flags 222 may be used when servers 118 allow clients to choose from a list of sections of content. Debug flags 224 may be used by developers to apply debug flags when generating the response.

Custom parameters may be incorporated by prefetch engine 112 in requests 116 to servers 118. In this way, client application 102 can provide parameters in the search query 106 that would normally be provided when requesting a specific piece of content (e.g. web request 702), discussed below in conjunction with FIG. 7. For example, some client/server applications allow client application 102 to select sections of content to be included in the response. As a specific example, an e-commerce application may support several different payment options, including some that are only applicable for mobile devices. As such, if client application 102 is executing on a mobile device, the mobile web page or the mobile application may set a flag in application section selection flags 222 indicating that the mobile payment content item should be included in the response. Similarly, the mobile web page or mobile application may omit a flag indicating that a desktop payment content item should be included in the response. Client application 102 may also choose to include or exclude content based on available screen real estate, user preference, or the like. Prefetch engine 112 will include these custom parameters in request 116, such that response 120 is generated accordingly when it is pre-fetched. Debugging flags 224 may similarly be used in a debugging scenario to enable debug and logging settings when prefetching content.

Figure 3:
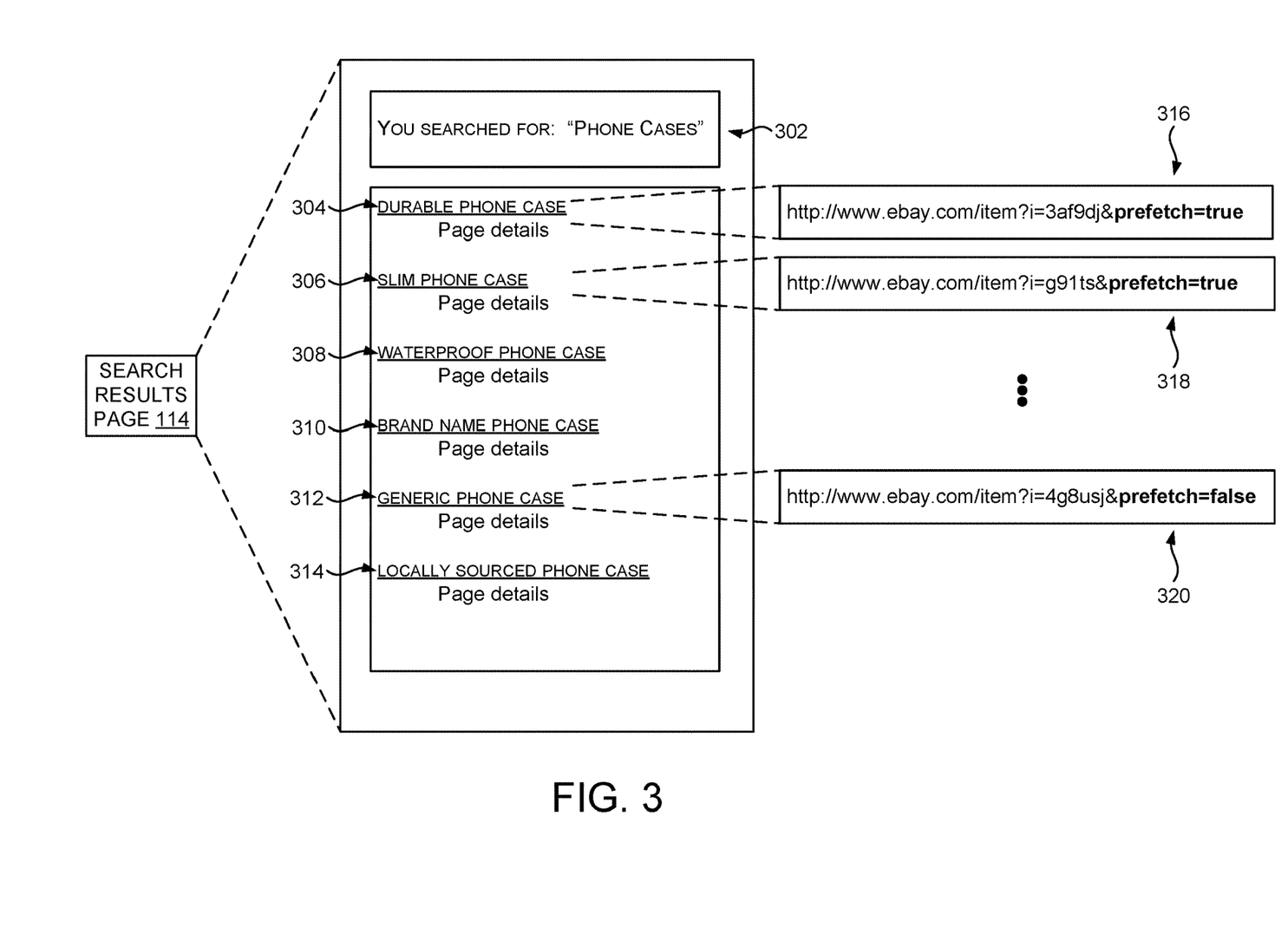
FIG. 3 illustrates exemplary search results returned by a search engine.

Turning now to FIG. 3, illustrated is an exemplary search result page 114 returned by a search engine. Search results page 114 includes search text indicator 302, which indicates to a user what was searched for, and a list of search results 304, 306, 308, 310, 312, and 314.

In some embodiments, prefetch enumerator 108 modifies the (URLs) associated with search results 304-314 to indicate whether a prefetch operation was initiated. For example, URLs 304 and 306 have been modified to set prefetch parameters 316 and 318 to true, indicating that prefetch enumerator 108 initiated a prefetch operation for these URLs. However, URL 312 has the prefetch parameter 320 set to false, indicating that prefetching was not initiated for this URL. In other embodiments, the absence of a prefetch parameter implies that prefetching was not initiated for a URL. As discussed in more detail below in conjunction with FIG. 7, embedding this information in the search results indicates whether or not prefetching has been initiated for a given search result.

Figure 4:
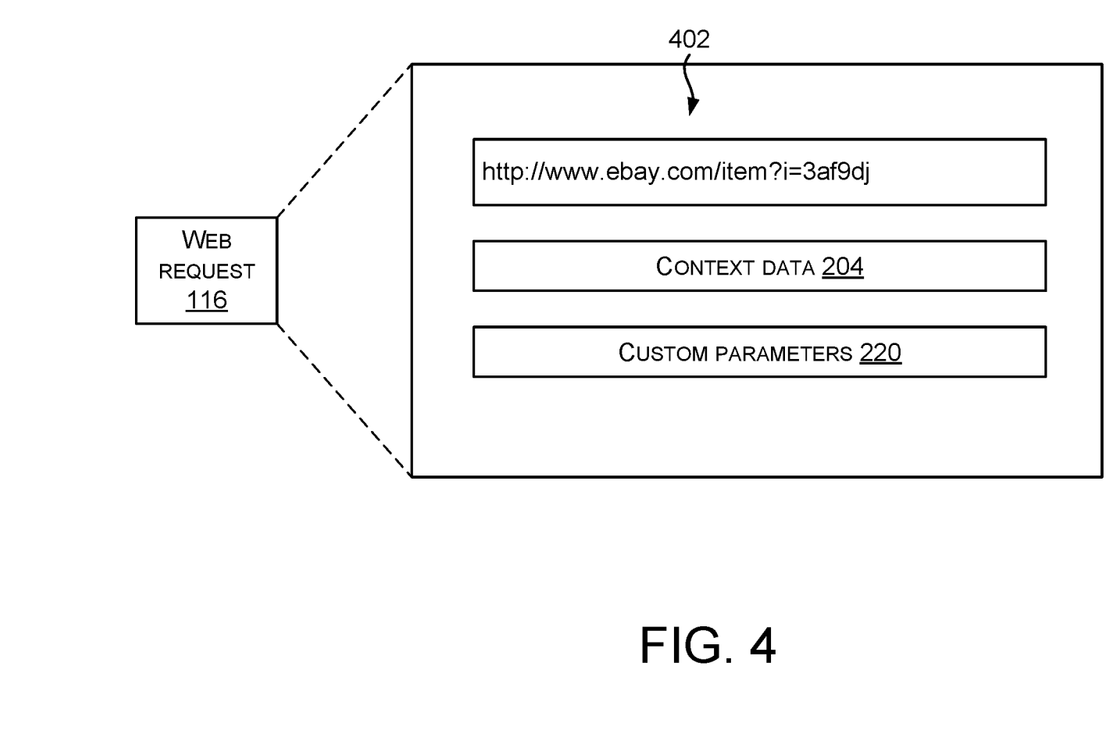
FIG. 4 illustrates an exemplary request sent by a prefetch engine to a server.

Turning now to FIG. 4, illustrated is an exemplary request 116 sent by a prefetch engine 112 to a server 118. In some embodiments, request 116 includes URL 402, which is one of the search results 109.

The request 116 may include context data 204 and custom parameters 220. By including context data 204, the request 116 impersonates the context that client application 102 will be in when activating a URL from the search results. This provides a consistent user experience, as the prefetched content will be generated based on the user's particular browser, locale, language, and other context information. Custom parameters 220 are supplied so that server 118 is able to perform the same customizations as if the request came directly from the client.

Figure 5:
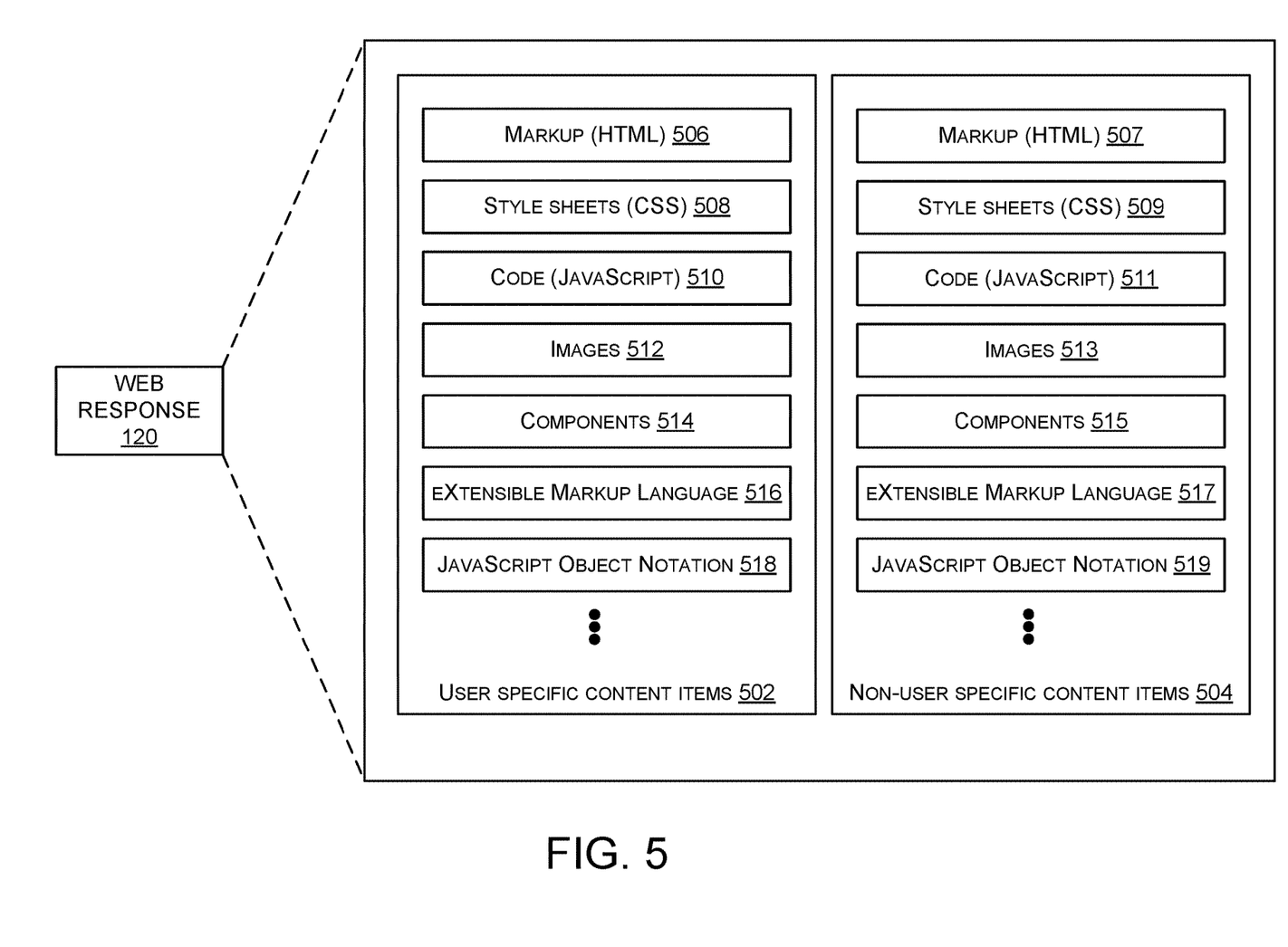
FIG. 5 illustrates an exemplary response received from the server.

Turning now to FIG. 5, illustrated is an exemplary response 120 received from the server 118. In some embodiments, response 120 may include content in its entirety. Additionally, or alternatively, response 120 may include one or more content items that content is divided into. These divisions may be naturally occurring, such as the division between markup, stylesheets, and code. For example, in one embodiment, response 120 is divided into one or more documents, each containing markup 506, stylesheets 508, code 510, images 512, components 514, eXtensible Markup Language (XML) 516, and JavaScript Object Notation (JSON) 518.

Additionally, or alternatively, these divisions may be created within a document of a particular type. For example, prefetch engine 112 may subdivide an HTML file based on DIVs, TABLEs, IFRAMEs, or other reusable components.

In some embodiments, content is classified based on whether it is user-specific or user-agnostic. For example, a product listing on an e-commerce website may include markup (HTML) 507, stylesheets 509, code 511, images 513, components 515, XML 517, JSON 519, and other content items 504 that are not specific to a particular user. These content items may be stored individually, i.e. not in association with the particular user, so that a subsequent web request from a different user can benefit from the cached content. Examples of user agnostic (i.e. user-independent) content includes a page title, a picture, an item description, etc. However, user-specific content items 502, such as shipping information (which is based on a user's location), search history, etc., is stored per-user, or not stored at all.

Figure 6:
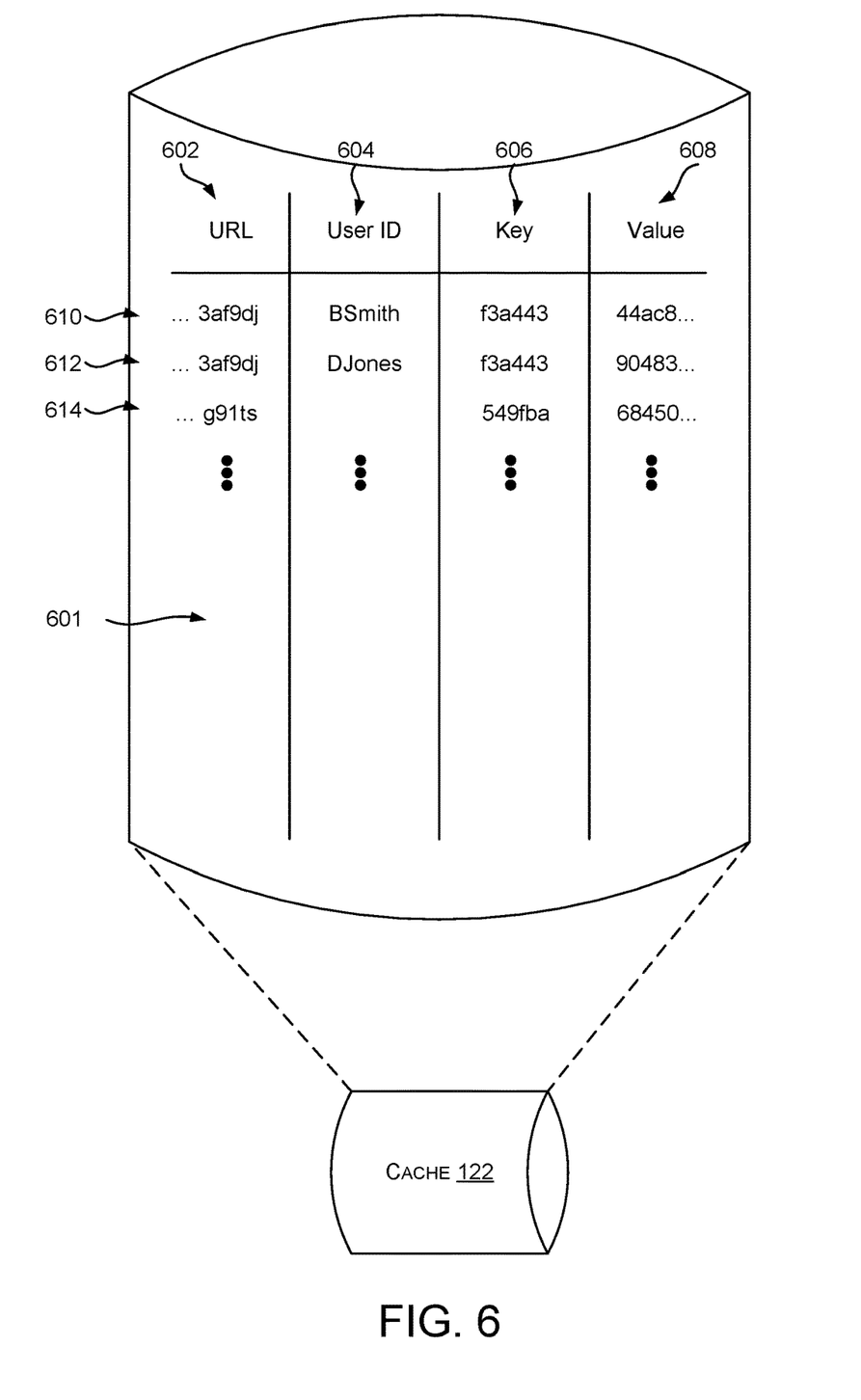
FIG. 6 illustrates an exemplary data cache comprising cached content items.

Turning now to FIG. 6, illustrated is an exemplary data cache 122 including cached content. In some embodiments, cache 122 stores cached data in a table 601. For example, table 601 may include URL column 602, user ID column 604, key column 606, and value column 608. This is but one example of a cache. Other caches, e.g. a cache that includes only an index column and a value column, are similarly contemplated. For example, an index column may include a unique identifier (e.g. a URL), or a hash of a URL and user ID, or a hash of a URL, a user ID, and an identifier of a particular portion of the document (e.g. a particular DIV element).

Data cache 122 may also include a timeout column, not pictured, that indicates when cached content becomes invalid. Cache timeouts may be based on a time, e.g. a number of minutes since the cache entry was created. Additionally, or alternatively, cache timeouts may be based on a number of read operations. Storing a new value in an existing cache entry may reset the cache timeout.

URL column 602 may be used to match cached content with a requested URL. In some embodiments, instead of storing the entire URL, an abbreviated form of the URL, a unique identifier contained within the URL, or a one-way hash of the URL may be stored.

User ID column 604 indicates which user requested the content that is stored in this row. For example, rows 610 and 612 both refer to the same URL ("www<dot>ebay<dot>com/item?i=3af9dj"), however row 610 stores the results generated for user B Smith, while row 612 sores results generated for user DJones.

Key column 606 stores a key used to identify a particular content item within a document. This key may be an HTML Id or Name attribute of an HTML tag, for example, that refers to a specific element with an HTML Document. As depicted, rows 610 and 612 contain the same key for the same URL. However, as the User ID 604 is different, values 608 are different. This may mean that the content (or content item) referred to by the key "f3a443" is user-specific, such as shipping information based on the user's location.

The data stored in value column 608 may include the cached content itself, e.g. a serialized version of the content. Additionally, or alternatively, value column 608 may include a pointer to content stored in an external data store.

Row 614 has a blank user ID column 604, indicating that the value is valid for any user.

Figure 7:
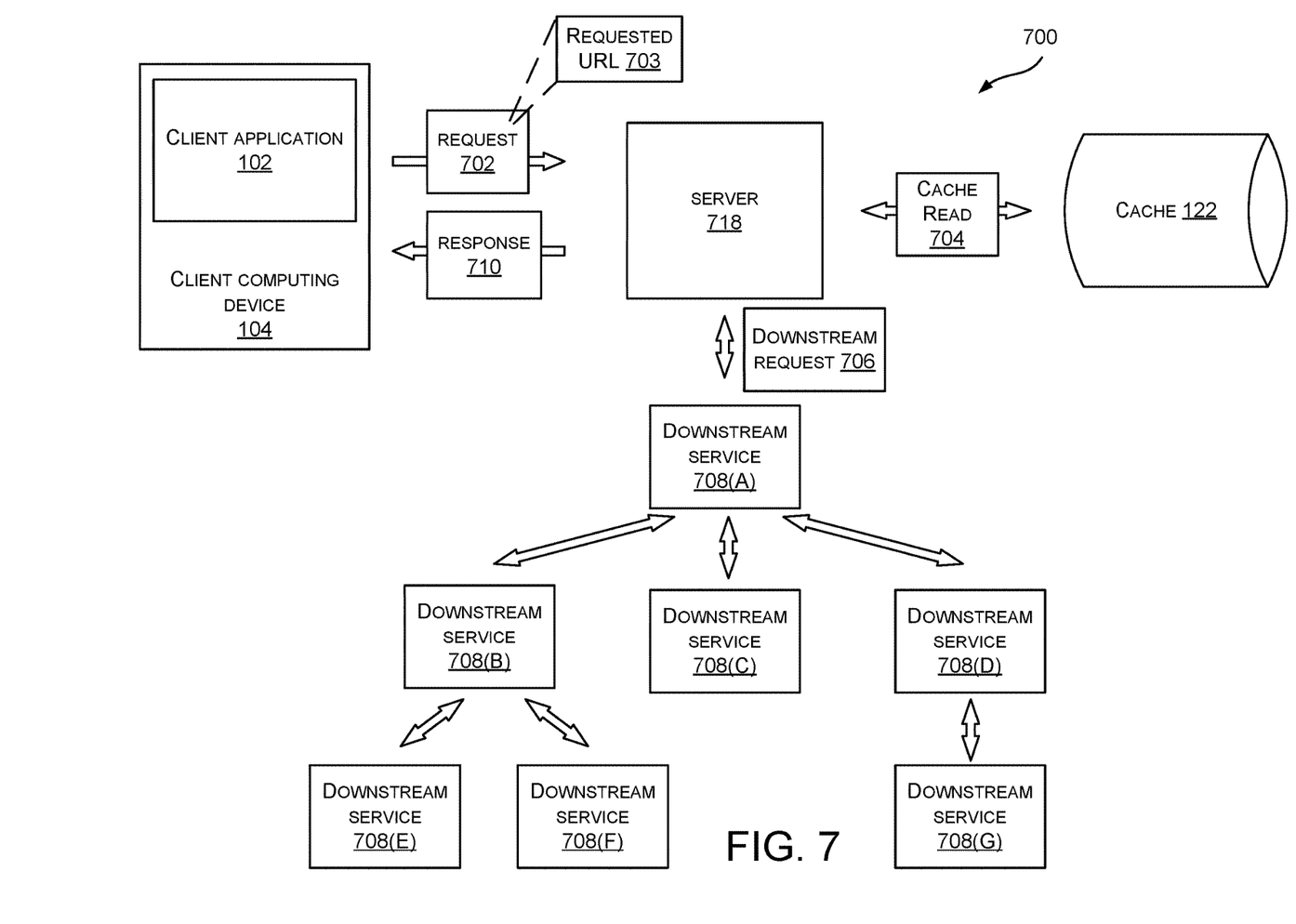
FIG. 7 illustrates an exemplary system for requesting content in a search result page.

Turning now to FIG. 7, illustrated is an exemplary system 700 for requesting, retrieving, and rendering content linked to in the search result page 114. In some embodiments, client application 102 running on client computing device 104 sends request 702 to server 718. In some embodiments, request 702 is caused by a user clicking on URL 703 in search result page 114 (e.g. one of URLs 304-314)

As discussed above, in some embodiments, URL 703 includes a query parameter indicating whether a prefetch operation was initiated for the activated URL. If it is determined that the prefetch operation was initiated, server 718 sends cache read request 704 to cache 122 to read one or more cached content items. Cache read request 704 may include URL 703. In some embodiments, cache read request 704 also includes a user ID, in order to retrieve user specific information. In some embodiments, cache 122 returns content and/or one or more content items associated with URL 703 and/or the user ID. These one or more items of content may be incorporated into response 710, which is returned to client application 102.

If the prefetch parameter indicates that a prefetch was not initiated (e.g. "&prefetch=false"), or if the cache was not populated (e.g. prefetching took too long), web server 718 may send a downstream request 706 to downstream services 708 in order to generate response 710. Downstream services may be implemented as one or more dependent services.

FIG. 7 depicts downstream services 708(A)-708(G) in a dependence hierarchy (e.g. downstream service 708(A) is dependent on (B), (C), and (D), (B) is dependent on (E) and (F), and (D) is dependent on (G)). While a handful of downstream services are depicted, real world scenarios incorporate hundreds of downstream services.

In some embodiments, client application 102 may receive a search result page 114 including URLs modified by prefetch enumerator 108 to indicate that a prefetch operation was initiated. Since it takes a user an average of one second to click on a particular URL in a search result, there is time available for the client application 102 to download some or all of the cached content. For example, client application 102 may, before the user clicks on a link, determine if the link includes a query parameter indicating that a prefetch operation was initiated for that link (e.g. if the query parameter "prefetch=true" is contained in the URL). If it is determined that a prefetch operation was initiated for the link, a request for the linked content may be sent, potentially utilizing any prefetched content stored in cache 122. This may further reduce latency by initiating the request soon after the search results are received (or at least before actual user input is received). In some embodiments, if the response is received by the client before the user clicks on the corresponding link, the requested content could be displayed almost instantly.

Figure 8:
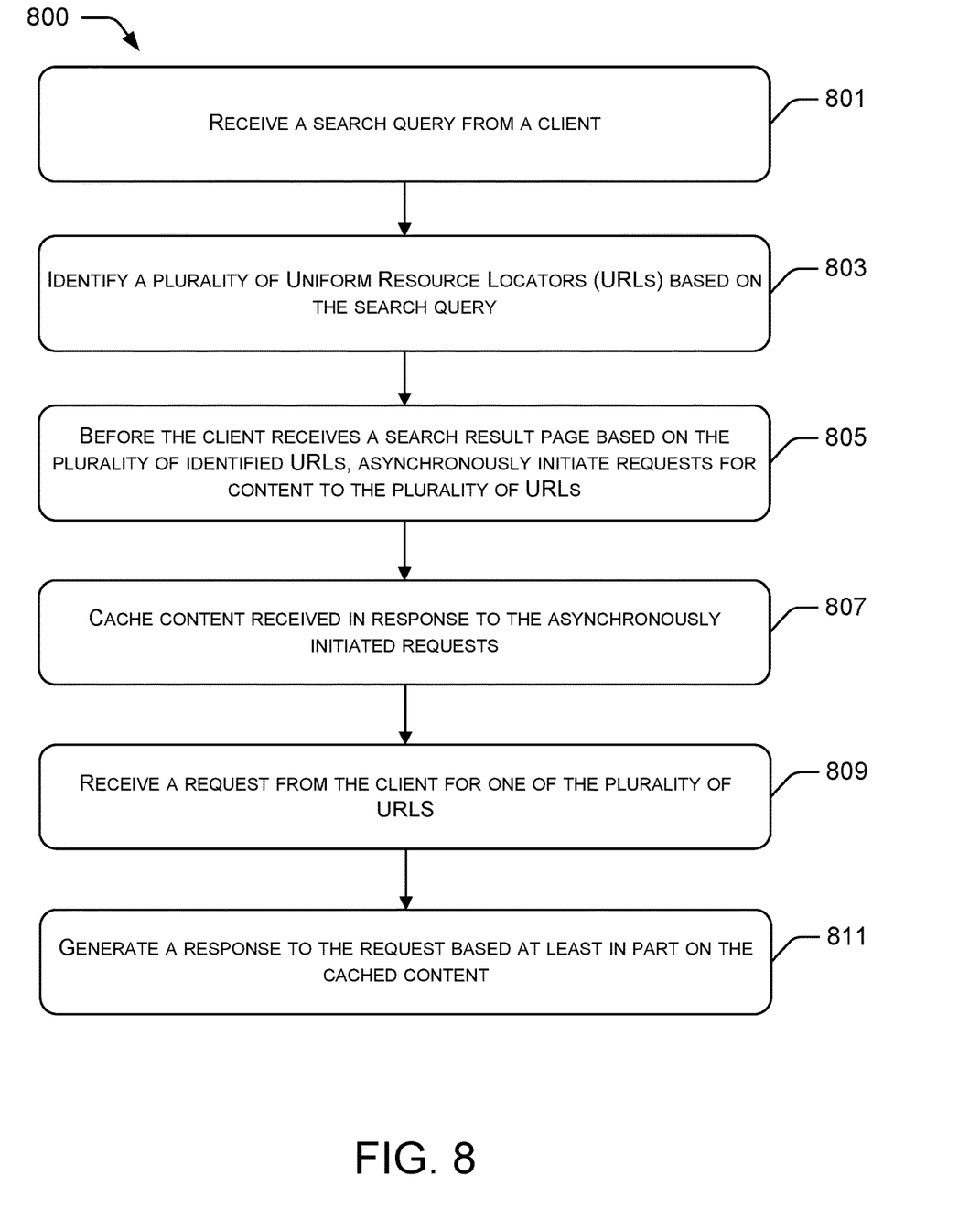
FIG. 8 illustrates an example process of reducing response latency by pre-fetching and caching content items linked to in a search result page.

FIG. 8 illustrates example process 800 for reducing latency of a client-server software application 102. The processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

FIG. 8 illustrates an example process 800 of reducing response latency by pre-fetching and caching content items linked to in a search result page. At block 801, a search query 106 is received from a client application 102. As discussed herein, the search query 106 may include query text 202, client context data 204, and custom parameters 220.

At block 803, a plurality of URLs 109 are identified. In some embodiments the URLs 109 are identified by a search engine 110 processing the search query 106. However, the plurality of URLs 109 may be identified by submitting a SQL query to a SQL database, or a file query to a filesystem, or any other type of search.

At block 805, in one embodiment, before the client 102 receives a search results page 114 based on the identified URLs 109, asynchronous web requests 116 are initiated for some or all of the identified URLs 109. In some embodiments, client context data 204 and custom parameters 220 that were provided in the search query 106 are included in the asynchronous web requests 116, allowing the client 102 to provide parameters 220 and client context 204 to the server 118. This ensures there is fidelity between the prefetched content 120 and content the user would view directly, without prefetching. Furthermore, by including the parameters 220 in the asynchronous web request 116, the prefetch engine enables the client 102 to customize the pre-fetched content 120.

In some embodiments, the enumeration engine 108 modifies the search result page 114 to indicate which pieces of content have had asynchronous web requests initiated. In some embodiments, the URLs that have been (or will be) prefetched are modified with a query parameter 316, such as "&prefetch=true."

At block 807, content 120 is received in response to the asynchronous web requests 116. As discussed above in conjunction with FIG. 5, the content 120 may comprise a piece of content as a whole, or maybe divided into content items. Content items may be distinguished based on document type, whether the content items are user specific or user agnostic, whether they may become stale or not, or any other metric.

In some embodiments, the received content 120 is cached, e.g. in cache 122 as discussed above in conjunction with FIG. 6.

At block 809, a request 702 is received from the client 102 for one of the plurality of URLs 703 contained in the search result page 114.

At block 811, a response 710 to the request 702 received at block 809 is generated. In some embodiments, if the requested URL 703 indicates that a prefetch operation was initiated, cache 122 is queried to retrieve any content items, or the entire piece of content, for inclusion in the response 710. Portions of the requested piece of content that are not cached may then be generated by one or more downstream services 708, as discussed above in conjunction with FIG. 7. In some embodiments, the response 710 is then transmitted to client 102.

Figure 9:
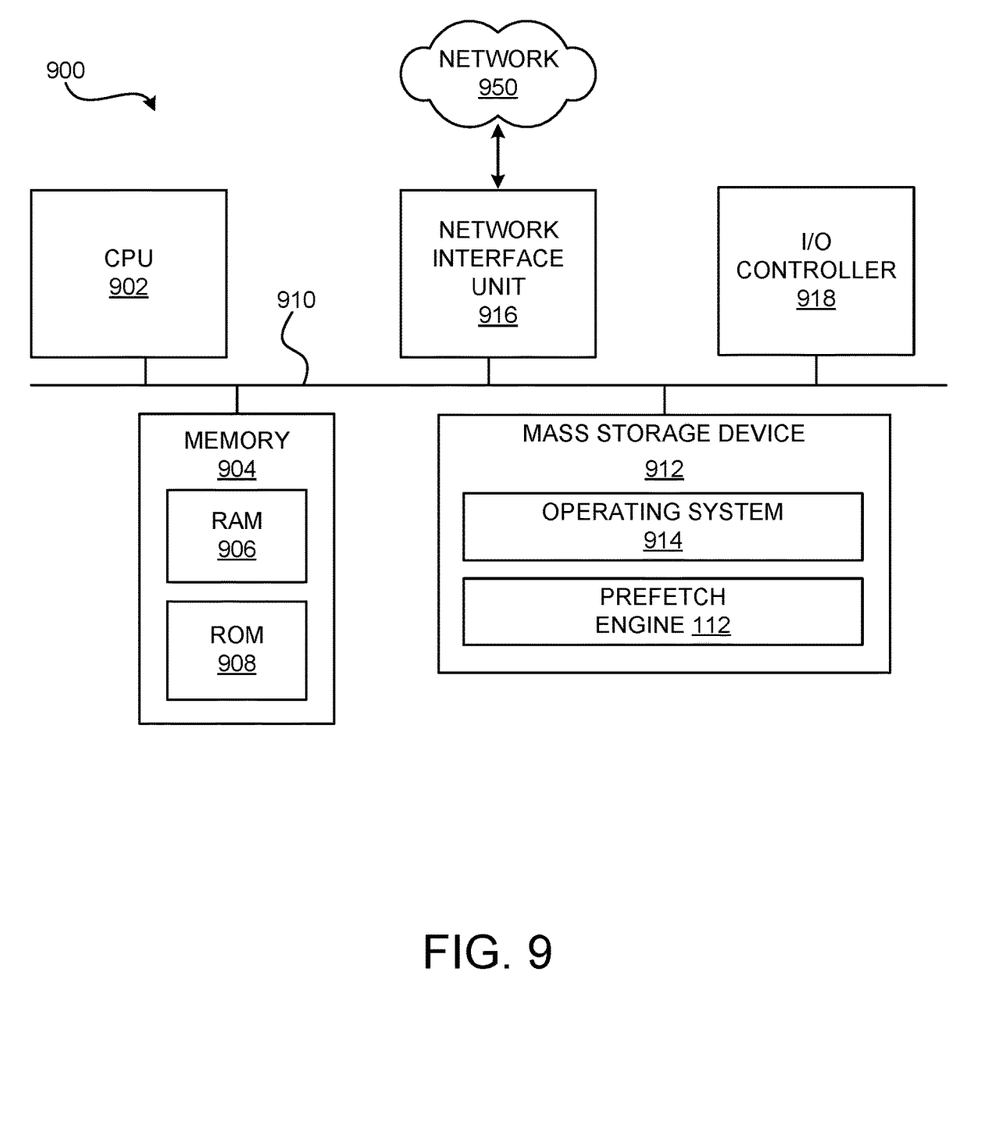
FIG. 9 shows additional details of an example computer architecture for a computer capable of executing the software components described herein.

FIG. 9 shows additional details of an example computer architecture for a computer capable of providing the functionality described herein such as, for example, that described with reference to the prefetch engine 112, or any program components thereof as described herein. Thus, the computer architecture 900 illustrated in FIG. 9 illustrates an architecture for a server computer, or network of server computers, or any other types of computing devices suitable for implementing the functionality described herein. The computer architecture 900 may be utilized to execute any aspects of the software components presented herein.

The computer architecture 900 illustrated in FIG. 9 includes a central processing unit 902 ("CPU"), a system memory 904, including a random-access memory 906 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing an operating system 914, other data, and one or more application programs. The mass storage device 912 may further include the prefetch engine 112.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium" and variations thereof, does not include waves, signals, and/or other transitory and/or intangible communication media, per se.

According to various techniques, the computer architecture 900 may operate in a networked environment using logical connections to remote computers through a network 950 and/or another network (not shown). The computer architecture 900 may connect to the network 950 through a network interface unit 916 connected to the bus 910. It should be appreciated that the network interface unit 916 also may be utilized to connect to other types of networks and remote computer systems. The computer architecture 900 also may include an input/output controller 918 for receiving and processing input from a number of other devices, including a keyboard, mouse, or electronic stylus (not shown in FIG. 9). Similarly, the input/output controller 918 may provide output to a display screen, a printer, or other type of output device (also not shown in FIG. 9). It should also be appreciated that via a connection to the network 950 through a network interface unit 916, the computing architecture may enable the product of the prefetch engine 112 to be distributed.

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
    identifying a plurality of search result Uniform Resource Locators (URLs) based on a search query received from a client;
    before the client receives a search result page comprising hyperlinks to the plurality of search result URLs, asynchronously initiating requests for content to the plurality of search result URLs;
    obtaining content received in response to the asynchronously initiated requests and parsing the obtained content to identify at least a portion of the obtained content that is generated specific to the client from which the search query is received;
    caching the content received in response to the asynchronously initiated requests, the cached content excluding the portion of the obtained content that is generated specific to the client from which the search query is received;
    receiving a request from the client for one of the plurality of search result URLs;
    generating a response to the request based, at least in part, on the cached content and maintaining the cached content after generating the response; and
    responsive to receiving a request from a different client pertaining to one of the plurality of search result URLs, transmitting a response to the different client that includes at least a portion of the cached content.

2. The computer-implemented method of claim 1, wherein the search query comprises a search query text and context data defining properties of the client, and wherein the asynchronously initiated requests comprise at least some of the context data.

3. The computer-implemented method of claim 1, wherein
    the search query comprises context data that includes parameters generated by the client when requesting one of the plurality of URLs,
    wherein the asynchronously initiated requests include the parameters, and
    wherein asynchronously initiating the requests comprises causing a web service that processes the requests to customize the content based on the parameters.

4. The computer-implemented method of claim 3, wherein the content received in response to the asynchronously initiated requests comprises a proper subset of a plurality of sections, and wherein the proper subset of the plurality of sections are included in the obtained content based on the parameters.

5. The computer-implemented method of claim 1, further comprising:
    selecting a defined number of search result URLs from the plurality of search result URLs; and
    modifying, in the search result page, hyperlinks to the selected search result URLs to include data indicating that prefetching was performed.

6. The computer-implemented method of claim 5, further comprising:
    responsive to receiving the request from the client for the one of the plurality of search result URLs, determining whether prefetching was performed for the one of the plurality of search result URLs based on the indication in the modified hyperlink;
    responsive to determining that prefetching was performed, generating the response to the request based, at least in part, on the cached content; and
    responsive to determining that prefetching was not performed, generating the response to the request based on a real-time request to a downstream web service.

7. The computer-implemented method of claim 1, wherein the client executes on a client device and wherein the computer-implemented method is performed by a server computing device.

8. The computer-implemented method of claim 1, wherein generating the response to the request based on the cached content comprises identifying at least one content item in the cached content associated with the one of the plurality of search result URLs and including the at least one content item in the response to the request.

9. The computer-implemented method of claim 1, wherein generating the response to the request based on the cached content comprises identifying, in the cached content, a pointer to at least one content item stored in an external data store from the cached content, wherein the pointer is associated with the one of the plurality of URLs and generating the response to the request comprises retrieving the at least one content item from the external data store.

10. A system comprising:
one or more processing units; and
a computer-readable medium having encoded thereon computer-executable instructions to cause the one or more processing units to:
determine, at a network service executing on the one or more processing units, a plurality of search result URLs based on a search query received from a client;
asynchronously initiate requests to the plurality of search result URLs;
obtain content received in response to the asynchronously initiated requests and parse the obtained content to identify a portion of the obtained content that is generated specific to the client;
cache content received in response to the asynchronously initiated requests, the cached content excluding the portion of the obtained content that is generated specific to the client;
receive a request from the client addressed to one of the plurality of search result URLs;
generate a response to the request based in part on the cached content; and
responsive to receiving a request from a different client pertaining to one of the plurality of search result URLs, generating a different response based in part on the cached content and transmit the different response to the different client.

11. The system of claim 10, wherein the client comprises a browser application or a native application.

12. The system of claim 10, wherein the response to the request comprises instructions that cause the client to pre-fetch cached content.

13. A computer-readable storage medium having instructions stored thereon that are executable to perform operations comprising:
receiving a search query from a client executing on a client device;
determining a plurality of search result URLs based on the search query;
asynchronously initiating requests to the plurality of search result URLs independent of when a search result page containing hyperlinks to the plurality of search result URLs is returned to the client;
obtaining content received in response to the asynchronously initiated requests and parsing the obtained content to identify at least a portion of the obtained content that is generated specific to the client from which the search query was received;
caching content received in response to the asynchronously initiated requests, the cached content excluding the portion of the obtained content that is generated specific to the client from which the search query is received;
receiving a request from the client for one of the plurality of search result URLs;
generating a response to the request based in part on the cached content; and
responsive to receiving a request from a different client pertaining to one of the plurality of search result URLs, transmitting a response to the different client that includes at least a portion of the cached content.

14. The computer-readable storage medium of claim 13, wherein the determined plurality of search result URLs are received from a search engine.

15. The computer-readable storage medium of claim 13, wherein the requests are asynchronously initiated before all of the plurality of search result URLs are determined.

16. The computer-readable storage medium of claim 13, wherein the search query comprises search query text and context data defining properties of the client, and wherein the asynchronously initiated requests comprise at least some of the context data.

17. The computer-readable storage medium of claim 16, wherein context data defines at least one of attributes associated with the client, attributes associated with a user operating the client, or attributes associated with the client device.

18. The computer-readable storage medium of claim 17, wherein the attributes associated with the client comprise a browser type or a browser version.

19. The computer-readable storage medium of claim 17, wherein the attributes associated with the user operating the client comprise a locale or a preferred language.

20. The computer-readable storage medium of claim 17, wherein the attributes associated with the client device comprise an operating system or an internet protocol address.

* * * * *